US012606053B2

(12) United States Patent
  Pezzati

(10) Patent No.: US 12,606,053 B2
(45) Date of Patent: Apr. 21, 2026

(54) ELECTRIC DRIVE VEHICLE

(71) Applicant: FERRARI S.P.A., Modena (IT)

(72) Inventor: Andrea Pezzati, Modena (IT)

(73) Assignee: FERRARI S.P.A., Modena (IT)

( * ) Notice: Subject to any disclaimer, the term of this patent is extended or adjusted under 35 U.S.C. 154(b) by 267 days.

(21) Appl. No.: 18/553,760

(22) PCT Filed: Apr. 7, 2022

(86) PCT No.: PCT/IB2022/053258
  § 371 (c)(1),
  (2) Date: Oct. 3, 2023

(87) PCT Pub. No.: WO2022/215023
  PCT Pub. Date: Oct. 13, 2022

(65) Prior Publication Data
  US 2024/0190296 A1     Jun. 13, 2024

(30) Foreign Application Priority Data
  Apr. 7, 2021    (IT) ......................... 102021000008633

(51) Int. Cl.
  B60L 58/26     (2019.01)
  B60K 1/00     (2006.01)
  (Continued)

(52) U.S. Cl.
  CPC .............. B60L 58/26 (2019.02); B60L 53/20 (2019.02); H01M 10/613 (2015.04);
  (Continued)

(58) Field of Classification Search
  CPC .. H01M 10/613; H01M 10/625; H01M 10/63; H01M 10/633; H01M 10/6567; H01M 10/6568; B60K 2001/0422–0438
  See application file for complete search history.

(56) References Cited

U.S. PATENT DOCUMENTS 10,153,524 B2 * 12/2018 Dinh .................... H01M 10/625
11,309,599 B2 * 4/2022 Yamagishi .......... H01M 50/249
(Continued)

FOREIGN PATENT DOCUMENTS

JP      2013136266 A    7/2013
WO   WO-2019039188 A1 *  2/2019 ............ H01M 10/48
WO      2019048848 A1    3/2019

OTHER PUBLICATIONS

International Search Report for International Application No. PCT/IB2022/053258, International Filing Date Apr. 7, 2022, Date of Mailing Jul. 11, 2022, 5 pages.
(Continued)

*Primary Examiner* — James J Taylor, II
(74) *Attorney, Agent, or Firm* — CANTOR COLBURN LLP

(57) ABSTRACT

A vehicle having: a power storage system; a main thermo-regulation circuit that is configured to distribute a thermo-regulation liquid within the power storage system; a thermoregulation system that is arranged in a front position, and is configured to cause the thermoregulation liquid to circulate in the main thermoregulation circuit; at least one component that is arranged in a rear position behind; and a secondary thermoregulation circuit that is arranged in a rear position and is coupled to the component. The main thermoregulation circuit has: a drawing point that goes through the rear wall of the power storage system and supplies the thermoregulation liquid to the secondary thermoregulation circuit; and a return point that goes through the rear wall of the power storage system and receives the thermoregulation liquid from the secondary thermoregulation circuit.

21 Claims, 4 Drawing Sheets

(51) Int. Cl.

| | |
|---|---|
| B60K 1/02 | (2006.01) |
| B60K 1/04 | (2019.01) |
| B60K 7/00 | (2006.01) |
| B60L 53/20 | (2019.01) |
| H01M 10/613 | (2014.01) |
| H01M 10/625 | (2014.01) |
| H01M 10/633 | (2014.01) |
| H01M 10/6568 | (2014.01) |

(52) U.S. Cl.

CPC ..... *H01M 10/625* (2015.04); *H01M 10/6568* (2015.04); *B60K 2001/005* (2013.01); *B60K 1/02* (2013.01); *B60K 2001/0438* (2013.01); *B60K 2007/0092* (2013.01); *B60L 2210/10* (2013.01); *H01M 10/633* (2015.04)

(56) References Cited

U.S. PATENT DOCUMENTS

| | | | | |
|---|---|---|---|---|
| 11,420,510 | B2 * | 8/2022 | Kuno | .................. H01M 50/209 |
| 11,479,087 | B2 * | 10/2022 | Yamagishi | ............. B60K 11/02 |
| 11,685,292 | B2 * | 6/2023 | Amarasinghe | ......... B60K 11/04 |
| | | | | 165/80.2 |
| 2017/0271727 | A1 | 9/2017 | Ito et al. | |
| 2023/0170552 | A1 * | 6/2023 | Baeder | .............. H01M 10/6568 |
| | | | | 429/50 |

OTHER PUBLICATIONS

Written Opinion for International Application No. PCT/IB2022/053258, International Filing Date Apr. 7, 2022, Date of Mailing Jul. 11, 2022, 7 pages.

* cited by examiner

ELECTRIC DRIVE VEHICLE

CROSS-REFERENCE TO RELATED APPLICATIONS

This Patent Application claims priority from Italian Patent Application No. 102021000008633 filed on Apr. 7, 2021, the entire disclosure of which is incorporated herein by reference.

TECHNICAL FIELD OF THE INVENTION

This invention relates to an electric drive vehicle.

STATE OF THE ART

A vehicle may only be provided with one or more electric motors (and, in this case, the drive is exclusively electric) or it may be provided with one or more electric motors in combination with a thermal engine (and, in this case, the drive may be exclusively electric, exclusively thermal, or hybrid).

The electric motor (or each electric motor) is mechanically connected to the drive wheels and is electrically connected to a power storage system through the interposition of an electronic power converter.

The power storage system consists of groups of electrochemical cells (generally with a "pouch" or prismatic structure) connected together in series (to increase the overall electric voltage); the electrochemical cell groups are generally connected to each other in parallel (to increase the intensity of the overall electric current). The power storage system may be very large and heavy (particularly if the drive is exclusively electric, in which case the power storage system may weigh more than 500 kg).

In more modern vehicles, the power storage system has a flat and (relatively) thin shape in order to be integrated inside of the chassis. In this configuration, the power storage system comprises a container having a lower wall (which constitutes the bottom of the vehicle facing the road surface) and housing the various groups of electrochemical cells inside, each of which forms a corresponding module.

In order to operate correctly and avoid rapid degradation, the power storage system needs to be maintained at a fairly consistent operating temperature and, thus, must be coupled with a thermoregulation system that is able to cool the power storage system when there is excessive heat (including when a still vehicle is recharging) and is able to heat the power storage system when it is too cold (typically after a cold start). In fact, the temperature interval within which the batteries optimally operate ranges between 10° and 30° (the lithium batteries in some use conditions may reach 45°, which is considered a limit operating temperature). Above this interval, there is the risk that some components will deteriorate and, with over-heating beyond 70°, the risk of fire for flammable elements, such as the acids and solvents composing the electrolytes, increases. In contrast, below this interval, the battery may be subject to gaps in efficiency that, below zero, are translated into a loss of as much as 40% autonomy.

Generally, the thermoregulation system of the power storage system is arranged in a front position (or, in front of the passenger compartment) since it is easier and more effective to arrange the radiators used by the thermoregulation system in the front position.

In some vehicles, due to their bulk (for example, when the front part is particularly low and tapered for aerodynamic reasons), it is necessary to house in the front position (i.e., behind the passenger compartment) some components that need to be cooled in use, such as, for example, the on-board charger (OBC), the DC/DC converter to power the low-voltage utilities, and the hydraulic circuit used by the active suspensions.

In order to cool the components arranged in the rear position, it is possible to include a special cooling system; in any case, this solution requires arranging, in the rear position, at least one radiator and this may be very problematic since it requires forming, at the rear, an air intake (upstream of the radiator) and an air outlet (downstream of the radiator) both negatively interfering with the aerodynamic efficiency and with the aesthetic configuration. In order to cool the components arranged in the rear position, it is also possible to use the thermoregulation system of the power storage system; in any case, this thermoregulation system is arranged in a front position and, thus, it is necessary to arrange relatively large pipes (so as not to have excessive pressure losses) that run from the front to the back, crossing the space of the passenger compartment with a noticeable increase in weight and bulkiness.

SUBJECT AND SUMMARY OF THE INVENTION

The purpose of this invention is to provide an electric drive vehicle that is free of the drawbacks described above and is, at the same time, easy and economical to produce.

According to this invention, an electric drive vehicle is provided, according to what is claimed in the attached claims.

The claims describe preferred embodiments of this invention forming an integral part of this description.

BRIEF DESCRIPTION OF THE DRAWINGS

This invention will now be described with reference to the attached drawings that illustrate a non-limiting embodiment thereof, in which.

DETAILED DESCRIPTION OF PREFERRED EMBODIMENTS OF THE INVENTION

Figure 1:
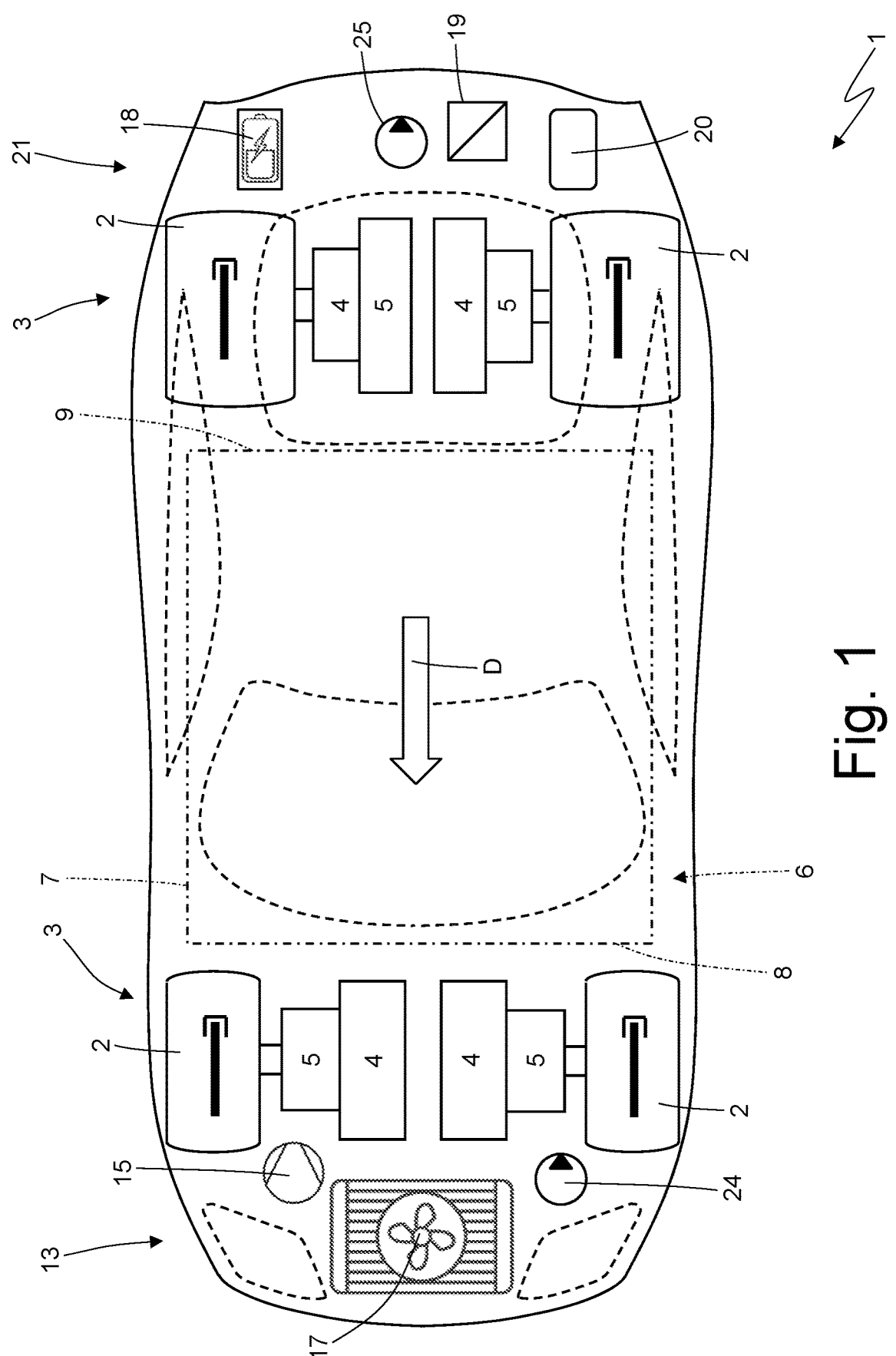
FIG. 1 is a schematic plan view of a road vehicle with electric drive produced according to this invention.

In FIG. 1, reference number 1 identifies, as a whole, a vehicle with electric drive provided with four drive wheels 2 (two front drive wheels 2 and two rear drive wheels 2).

The vehicle 1 comprises an electric drivetrain system 3 that is arranged at the front position (i.e., it is connected to the two front drive wheels 2) and an electric drivetrain system 3 that is arranged at the rear position (i.e., it is connected to the two rear drive wheels 2), is structurally identical to the electric drivetrain system 3 in the front position, and is mechanically independent and separate from the electric drivetrain system 3 arranged at the front position.

According to another embodiment not illustrated, the vehicle 1 comprises a single electric drivetrain system 3 (arranged at the front position or arranged at the rear position) and, thus, only has two drive wheels 2; in this embodiment, the vehicle 1 could also comprise a thermal drivetrain system connected to the drive wheels 2 that do not receive the motion from the single electric drivetrain system 3.

Each electric drivetrain system 3 comprises a pair of reversible electric machines 4 (i.e., that can function both as an electric motor absorbing electricity and generating mechanical torque, and as an electrical generator absorbing mechanical energy and generating electricity) provided with respective shafts and a pair of transmissions 5 connecting the electric machines 4 (i.e. the shafts of the electric machines 4) to the corresponding drive wheels 2 without the interposition of any clutch.

Each electric machine 4 is driven by a corresponding electronic AC/DC power converter (i.e., an inverter), which is connected to a power storage system 6 provided with chemical batteries; i.e., each electronic AC/DC power converter is bi-directional and comprises a side in direct current connected to the power storage system 6 and a side in alternating three-phase current that is connected to the corresponding electric machine 4.

Figure 3:
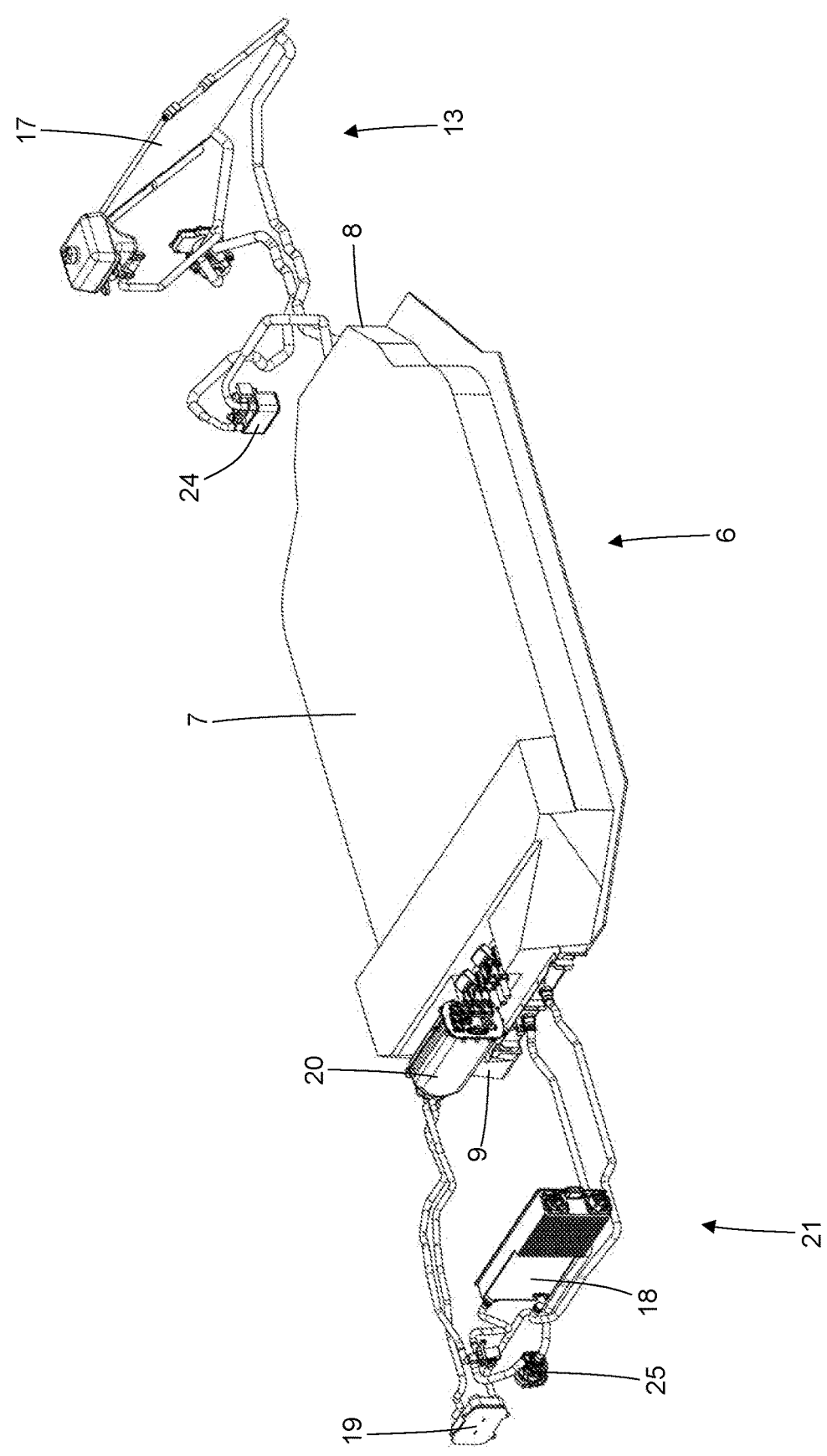
FIG. 3 is a perspective view of some parts of the vehicle in FIG. 1.
Figure 4:
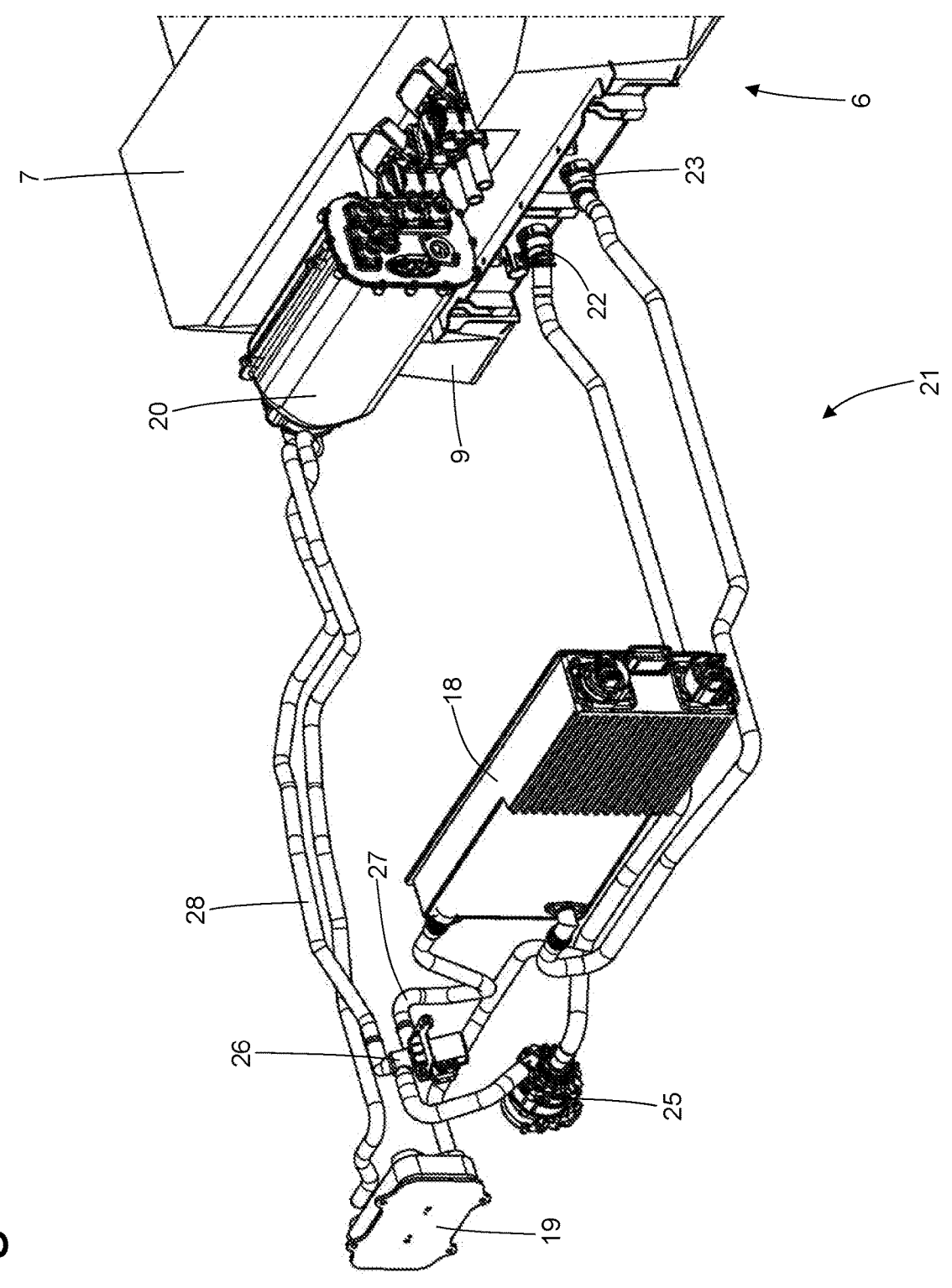
FIG. 4 is an enlarged view of a detail in FIG. 3.

According to what is illustrated in FIG. 3, the power storage system 6 has a flat and (relatively) thin shape in order to be integrated inside of the vehicle 1 chassis. In particular, the power storage system 6 comprises a container 7 that internally houses multiple modules provided with respective electrochemical cells with a parallelepipedal shape (i.e., having a "pouch" structure, or a prismatic structure). The container 7 has a lower wall (which constitutes the bottom of the vehicle 1 facing the road surface and is, of course, oriented horizontally), an upper wall that is parallel and opposite to the lower wall, a front wall 8 facing a front part of the vehicle 1 (i.e. facing the front of the vehicle 1 in relation to the forward direction D), and has a rear wall 9 that is opposite the front wall 8 and faces a rear part of the vehicle 1 (i.e. facing the back of the vehicle 1 in relation to the forward direction D).

Figure 2:
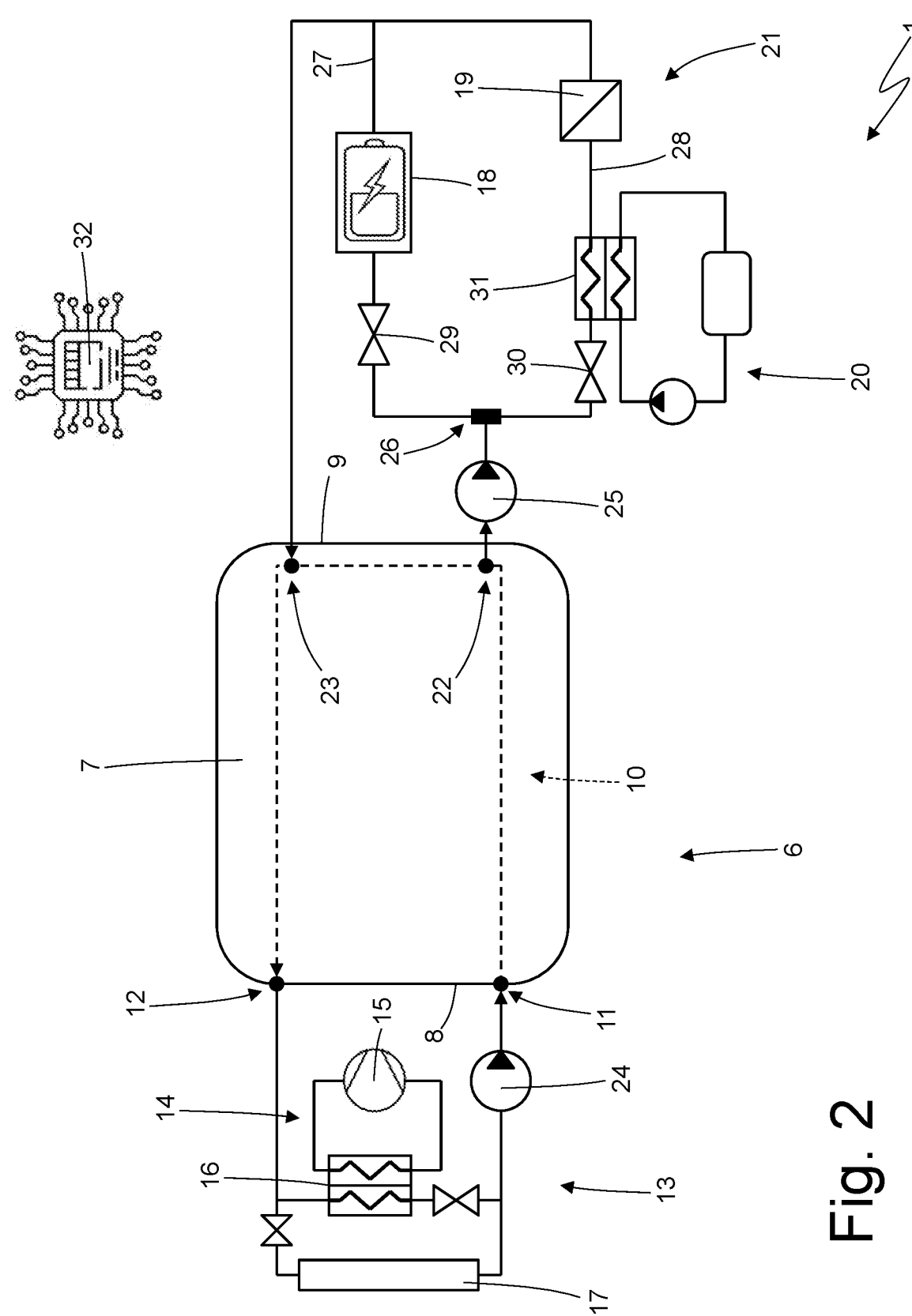
FIG. 2 is a schematic view of some parts of the vehicle in FIG. 1.

According to what is illustrated in FIG. 2, the power storage system 6 is coupled to (integrated with) a main thermoregulation circuit 10 that is arranged inside the power storage system 6 (i.e., inside the container 7) and is configured to distribute a thermoregulation liquid (typically water-based) inside the power storage system 6 (i.e., inside the container 7). The main thermoregulation circuit 10 has an inlet 11 for the thermoregulation liquid (i.e. a point in which the thermoregulation liquid enters the main thermoregulation circuit 10) arranged through the front wall 8 of the power storage system 6 (i.e. of the container 7); in addition, the main thermoregulation circuit 10 has an outlet 12 for the thermoregulation liquid (i.e. a point in which the thermoregulation liquid leaves the main thermoregulation circuit 10) arranged through the front wall 8 of the power storage system 6 (i.e. of the container 7). In use, the thermoregulation liquid circulates through the main thermoregulation circuit 10 entering through the inlet 11 and leaving (in equal measure) through the outlet 12.

The vehicle 1 comprises a thermoregulation system 13, which is arranged in a front position in front of the front wall 8 of the power storage system 6 (i.e., of the container 7) and is configured to cause the thermoregulation liquid to circulate in the main thermoregulation circuit 10 introducing the thermoregulation liquid into the inlet 11 and receiving (in equal measure) the thermoregulation liquid from the outlet 12. In use, the thermoregulation system 13 cools the thermoregulation liquid (if the power storage system 6 needs to be cooled) i.e., it heats the thermoregulation liquid (if the power storage system 6 needs to be heated).

In the example embodiment illustrated in the attached figures, the thermoregulation system 13 comprises a heat pump circuit 14 that is provided (among other things) with a compressor 15 and a heat exchanger 16 that exchanges heat with the thermoregulation liquid (i.e., it can both heat and cool the thermoregulation liquid). Obviously, the heat pump circuit 14 could be replaced with an electric heater and a conventional cooling circuit. The thermoregulation system 13 preferably also comprises a radiator 17 that may be used (when the environmental conditions are right) to cool the thermoregulation liquid in combination with or alternately to the heat pump circuit 14.

The vehicle 1 comprises a component 18 consisting of an on-board charger of the power storage system 6; i.e., the component 18 is used only when the vehicle 1 is parked, to recharge the power storage system 6, using an external power source connected via cable.

The vehicle 1 comprises a component 19 consisting of a DC/DC converter powering the low-voltage utilities of the vehicle 1 itself; i.e., only when the vehicle 1 is in use, the DC/DC converter transfers a part of the power stored at high voltage (several hundred nominal volts) in the power storage system 6 into an additional low-voltage electrical circuit (typically 12 nominal volts and generally provided with its own backup battery) to which a series of low-voltage utilities of the vehicle 1 is connected.

The vehicle 1 comprises a component 20 consisting of a hydraulic circuit used by an electronically controlled active suspension system; i.e., the active suspension system uses pressurised oil flowing in the hydraulic circuit to adjust the suspension response.

The components 18, 19, and 20 are all arranged at the rear position behind the rear wall 9 of the power storage system 6 (i.e., of the container 7) and, thus, are arranged opposite the thermoregulation system 13 (which is located at the front).

The vehicle 1 comprises a secondary thermoregulation circuit 21 that is arranged at the rear position behind the rear wall 9 of the power storage system 6 (i.e., of the container 7) and is coupled to three components 18, 19, and 20 to cool the components 18, 19, and 20 themselves (when necessary). It is important to highlight how the components 18, 19, and 20 must be cooled when their internal temperature is high, but they must never be heated since they do not have a minimum use temperature beyond which their performance deteriorates (considering the climates in which the vehicle 1 may reasonably be used).

The main thermoregulation circuit 10 comprises a drawing point 22 that goes through the rear wall 9 of the power storage system 6 (i.e., of the container 7) and supplies the thermoregulation liquid to the secondary thermoregulation circuit 21; in addition, the main thermoregulation circuit 10 comprises a return point 23 that goes through the rear wall 9 of the power storage system 6 (i.e. of the container) and receives the thermoregulation liquid from the secondary thermoregulation circuit 21. The two points 22 and 23 are preferably arranged relatively close to each other along the main thermoregulation circuit 10; i.e., between the drawing point 22 and the return point 23 the main thermoregulation circuit 10 only has one (short) connection pipe that does not perform thermal exchange with any component inside the power storage system 6.

As a result, the secondary thermoregulation circuit 21 uses the thermoregulation liquid that has been treated (i.e., cooled or heated) by the thermoregulation system 13 and drained (temporarily, i.e., "borrowed") from the main thermoregulation circuit 10 for its own operation. In fact, the secondary thermoregulation circuit 21 is entirely free of components designed to cool the thermoregulation liquid, since the secondary thermoregulation circuit 21 only has the function of circulating the thermoregulation liquid drained ("borrowed") from the main thermoregulation circuit 10 and treated (i.e., cooled or heated) by the thermoregulation system 13.

The thermoregulation system 13 comprises a pump 24 (obviously arranged at the front position), which is configured to cause the thermoregulation liquid to circulate through the main thermoregulation circuit 10. In addition, the secondary thermoregulation circuit 21 comprises a pump 25 (obviously arranged at the rear position), which is configured to cause the thermoregulation liquid to circulate through the secondary thermoregulation circuit 21 by sucking the thermoregulation liquid from the drawing point 22. In fact, without adequate sucking from the pump 25, only a minimum, negligible portion of the thermoregulation liquid would naturally flow through the secondary thermoregulation circuit 21 from the drawing point 21 to the return point 22.

The secondary thermoregulation circuit 21 has a bifurcation 26 in which the secondary thermoregulation circuit 21 is bifurcated into a branch 27 along which only the component 18 is arranged and a branch 28 along which the components 20 and 19 are arranged, one in series after the other. The two branches 27, 28 join one another downstream of the components 18, 19, 20 so as to flow together into the return point 23. The pump 25 is arranged upstream of the bifurcation 26, i.e., it is arranged between the drawing point 22 and the bifurcation 26.

Along the branch 27 an electronically controlled stop valve 29 is arranged that is designed to open or close the passage through the branch 27; similarly, along the branch 28, an electronically controlled stop valve 30 is arranged that is designed to open or close the passage through the branch 28.

In particular, the component 20 (i.e., the hydraulic circuit used by the electronically controlled active suspension system) comprises a heat exchanger 31 in which the pressurised oil flowing in the hydraulic circuit transfers heat to the thermoregulation liquid flowing along the branch 28 of the secondary thermoregulation circuit 21.

The vehicle 1 comprise a control unit 32 monitoring the operation of the thermoregulation circuits 10 and 21. In particular, the control unit 32 is configured to always and only open one stop valve 28 or 29 at a time, keeping the other stop valve 29 or 28 closed. In fact, the component 18 requires thermoregulation (in particular, cooling) only when the vehicle 1 is parked while the components 19 and 20 require thermoregulation (in particular cooling) only when the vehicle 1 is in motion and it is, thus, clear that the respective cooling requirements are mutually exclusive. In addition, the control unit 32 is configured to drive the pump 25 only when the thermoregulation system 13 cools the thermoregulation liquid and only when the components 18, 19, and 20 need to be cooled. In fact, when the external temperature is low and the power storage system 6 needs to be heated (thus, the thermoregulation liquid is hotter than the external environment) there is never the need to heat the components 18, 19, and 20 as well.

According to a preferred embodiment, the secondary thermoregulation circuit 21 has a nominal flow rate (for example, from 8-10 litres/minute) of the thermoregulation liquid that ranges between 10% and 35% of a nominal flow rate (for example, from 45-55 litres/minute) of the thermoregulation liquid of the main thermoregulation circuit 10.

This condition makes it possible to ensure that the impact of the presence of the secondary thermoregulation circuit 21 on the main thermoregulation circuit 10 is small and, thus, acceptable; in other words, the use of the secondary thermoregulation circuit 21 entails, overall, an increase of a few degrees centigrade of the temperature of the thermoregulation liquid and this increase of a few degrees centigrade does not have a significant impact on the uniformity of the cooling ensured by the main thermoregulation circuit 10. In other words, due to the presence of the secondary thermoregulation circuit 21, the temperature of the thermoregulation liquid at the return point 23 is a few degrees centigrade above the temperature of the thermoregulation liquid at the drawing point 22; in any case, this increase in temperature of a few degrees centigrade of the thermoregulation liquid has no significant impact on the uniformity of the cooling ensured by the main thermoregulation circuit 10.

The embodiments described herein may be combined between them without departing from the scope of protection of this invention.

The vehicle 1 described above has numerous advantages.

In the first place, the vehicle 1 described above enables the cooling, when necessary, of the components 18, 19, and 20 that are located at the rear position, using the cooling generated by the thermoregulation system 13 that is arranged at the rear position (i.e., arranged far from the components 18, 19, and 20) and, thus, without the need to install radiators at the rear position.

In addition, the vehicle 1 described above has no large hydraulic pipes that flow from the front to the rear, crossing the space of the passenger compartment, with a clear saving in weight and bulkiness. This result is obtained by using the whole power storage system 6 as a large "pipe" to carry a small part of the thermoregulation liquid that has been treated (i.e., cooled or heated) by the thermoregulation system 13 from the front to the rear.

Finally, the vehicle 1 described above has very reduced costs and production complexity, since the only true change is the creation of the points 22 and 23 at the rear wall 9 of the power storage system 6 (i.e., of the container 7).

REFERENCE NUMBER LIST FOR FIGURES 1 vehicle
2 wheels
3 drivetrain system
4 electric machine
5 transmission
6 power storage system
7 container
8 front wall
9 rear wall
10 main thermoregulation circuit
11 inlet
12 outlet
13 thermoregulation system
14 heat pump circuit
15 compressor
16 radiator
17 heat exchanger
18 component
19 component
20 component
21 secondary thermoregulation circuit
22 drawing point
23 return point
24 pump 25 pump
26 bifurcation
27 branch
28 branch
29 stop valve
30 stop valve
31 heat exchanger
32 control unit
D forward direction

The invention claimed is:

1. A vehicle (1) comprising:
at least one electric machine (4);
a power storage system (6), which is arranged in a central position, has a front wall (8) facing a front part of the vehicle (1) and has a rear wall (9) opposite the front wall (8) and facing a rear part of the vehicle (1);
a main thermoregulation circuit (10), which is arranged inside the power storage system (6), is configured to distribute a thermoregulation liquid within the power storage system (6) and has an inlet (11) for the thermoregulation liquid and an outlet (12) for the thermoregulation liquid;
a thermoregulation system (13), which is arranged in the front part of the vehicle (1) in front of the front wall (8) of the power storage system (6) and is configured to cause the thermoregulation liquid to circulate in the main thermoregulation circuit (10) introducing the thermoregulation liquid into the inlet (11) and receiving the thermoregulation liquid from the outlet (12);
a first component, which is arranged in the rear part of the vehicle (1) behind the rear wall (9) of the power storage system (6); and
a secondary thermoregulation circuit (21), which is arranged in the rear part of the vehicle (1) behind the rear wall (9) of the power storage system (6) and is coupled to the first component;
wherein the main thermoregulation circuit (10) comprises: a drawing point (22), which goes through the rear wall (9) of the power storage system (6) and supplies the thermoregulation liquid to the secondary thermoregulation circuit (21); and a return point (23), which goes through the rear wall (9) of the power storage system (6) and receives the thermoregulation liquid from the secondary thermoregulation circuit (21);
wherein the secondary thermoregulation circuit (21) is not provided with any radiator configured to cool the thermoregulation liquid; and
wherein the secondary thermoregulation circuit (21) is configured to cool the first component.

2. The vehicle (1) according to claim 1, wherein the thermoregulation system (13) comprises a first pump (24), which is configured to cause the thermoregulation liquid to circulate through the main thermoregulation circuit (10); and the secondary thermoregulation circuit (21) comprises a second pump (25), which is configured to cause the thermoregulation liquid to circulate through the secondary thermoregulation circuit (21) by sucking the thermoregulation liquid from the drawing point (22).

3. The vehicle (1) according to claim 2 further comprising a control unit (32), which is configured to operate the second pump (25) only when the thermoregulation system (13) cools the thermoregulation liquid and only when the first component needs to be cooled.

4. The vehicle (1) according to claim 1, wherein the first component consists of an on-board charger (18) of the power storage system (6); and the vehicle is further provided a second component consisting of a DC/DC converter (19) powering low-voltage utilities, arranged in the rear part of the vehicle (1) behind the rear wall (9) of the power storage system (6), and coupled to the secondary thermoregulation circuit (21).

5. The vehicle (1) according to claim 4, wherein, in a bifurcation (26), the secondary thermoregulation circuit (21) branches off into a first branch (27), along which the first component is arranged, and a second branch (28), along which the second component is arranged.

6. The vehicle (1) according to claim 5, wherein the secondary thermoregulation circuit (21) comprises a second pump (25), which is arranged upstream of the bifurcation (26) and is configured to cause the thermoregulation liquid to circulate through the secondary thermoregulation circuit (21) by sucking the thermoregulation liquid from the drawing point (22).

7. The vehicle (1) according to claim 5 further comprising:
a first stop valve (29), which is arranged along the first branch (27), and a second stop valve (30), which is arranged along the second branch (28); and
a control unit (32), which is configured to always open one of the first and second stop valves (28; 29) at a time keeping the other one of the stop valves (29; 28) closed.

8. The vehicle (1) according to claim 5 further comprising a third component, which is arranged along the second branch (28) in series to the second component and consists of a hydraulic circuit used by an electronically controlled active suspension system.

9. The vehicle (1) according to claim 5, wherein the first and second branches (27, 28) join one another downstream of the first and second components so as to flow together into the return point (23).

10. The vehicle (1) according to claim 1, wherein the secondary thermoregulation circuit (21) has a nominal flow rate of the thermoregulation liquid ranging from 10% to 35% of a nominal flow rate of the thermoregulation liquid of the main thermoregulation circuit (10).

11. The vehicle (1) according to claim 1, wherein the first component consists of an on-board charger of the power storage system (6).

12. The vehicle (1) according to claim 1, wherein the first component consists of a DC/DC converter (19) powering low-voltage utilities.

13. The vehicle (1) according to claim 1, wherein the first component consists of a hydraulic circuit used by an electronically controlled active suspension system.

14. A vehicle (1) comprising:
at least one electric machine (4);
a power storage system (6), which is arranged in a central position, has a front wall (8) facing a front part of the vehicle (1) and has a rear wall (9) opposite the front wall (8) and facing a rear part of the vehicle (1);
a main thermoregulation circuit (10), which is arranged inside the power storage system (6), is configured to distribute a thermoregulation liquid within the power storage system (6) and has an inlet (11) for the thermoregulation liquid and an outlet (12) for the thermoregulation liquid;
a thermoregulation system (13), which is arranged in the front part of the vehicle (1) in front of the front wall (8) of the power storage system (6) and is configured to cause the thermoregulation liquid to circulate in the main thermoregulation circuit (10) introducing the thermoregulation liquid into the inlet (11) and receiving the thermoregulation liquid from the outlet (12);

a component, which is arranged in the rear part of the vehicle (1) behind the rear wall (9) of the power storage system (6); and a secondary thermoregulation circuit (21), which is arranged in the rear part of the vehicle (1) behind the rear wall (9) of the power storage system (6) and is coupled to the component;

wherein the main thermoregulation circuit (10) comprises: a drawing point (22), which goes through the rear wall (9) of the power storage system (6) and supplies the thermoregulation liquid to the secondary thermoregulation circuit (21); and a return point (23), which goes through the rear wall (9) of the power storage system (6) and receives the thermoregulation liquid from the secondary thermoregulation circuit (21), wherein the thermoregulation system (13) comprises a first pump (24), which is configured to cause the thermoregulation liquid to circulate through the main thermoregulation circuit (10), wherein the secondary thermoregulation circuit (21) comprises a second pump (25), which is configured to cause the thermoregulation liquid to circulate through the secondary thermoregulation circuit (21) by sucking the thermoregulation liquid from the drawing point (22), and wherein it is provided a control unit (32), which is configured to operate the second pump (25) only when the thermoregulation system (13) cools the thermoregulation liquid and only when the component needs to be cooled.

15. A vehicle (1) comprising:

at least one electric machine (4);

a power storage system (6), which is arranged in a central position, has a front wall (8) facing a front part of the vehicle (1) and has a rear wall (9) opposite the front wall (8) and facing a rear part of the vehicle (1);

a main thermoregulation circuit (10), which is arranged inside the power storage system (6), is configured to distribute a thermoregulation liquid within the power storage system (6) and has an inlet (11) for the thermoregulation liquid and an outlet (12) for the thermoregulation liquid;

a thermoregulation system (13), which is arranged in the front part of the vehicle (1) in front of the front wall (8) of the power storage system (6) and is configured to cause the thermoregulation liquid to circulate in the main thermoregulation circuit (10) introducing the thermoregulation liquid into the inlet (11) and receiving the thermoregulation liquid from the outlet (12);

a first component and a second component, which are arranged in the rear part of the vehicle (1) behind the rear wall (9) of the power storage system (6); and a secondary thermoregulation circuit (21), which is arranged in the rear part of the vehicle (1) behind the rear wall (9) of the power storage system (6) and is coupled to the first and second components, wherein the main thermoregulation circuit (10) comprises: a drawing point (22), which goes through the rear wall (9) of the power storage system (6) and supplies the thermoregulation liquid to the secondary thermoregulation circuit (21); and a return point (23), which goes through the rear wall (9) of the power storage system (6) and receives the thermoregulation liquid from the secondary thermoregulation circuit (21), wherein the thermoregulation system (13) comprises a first pump (24), which is configured to cause the thermoregulation liquid to circulate through the main thermoregulation circuit (10), wherein the secondary thermoregulation circuit (21) comprises a second pump (25), which is configured to cause the thermoregulation liquid to circulate through the secondary thermoregulation circuit (21) by sucking the thermoregulation liquid from the drawing point (22), and wherein, in a bifurcation (26), the secondary thermoregulation circuit (21) branches off into a first branch (27), along which the first component is arranged, and a second branch (28), along which the second component is arranged.

16. The vehicle (1) according to claim 15, wherein the first component consists of an on-board charger (18) of the power storage system (6); and the second component consists of a DC/DC converter (19) powering low-voltage utilities.

17. The vehicle (1) according to claim 16, wherein the secondary thermoregulation circuit (21) comprises the second pump (25), which is arranged upstream of the bifurcation (26) and is configured to cause the thermoregulation liquid to circulate through the secondary thermoregulation circuit (21) by sucking the thermoregulation liquid from the drawing point (22).

18. The vehicle (1) according to claim 16 further comprising:

a first stop valve (29), which is arranged along the first branch (27), and a second stop valve (30), which is arranged along the second branch (28); and a control unit (32), which is configured to always open one of the first and second stop valves (28; 29) at a time keeping the other one of the first and second stop valve-valves (29; 28) closed.

19. The vehicle (1) according to claim 16 further comprising a third component, which is arranged along the second branch (28) in series to the second component and consists of a hydraulic circuit used by an electronically controlled active suspension system.

20. The vehicle (1) according to claim 16, wherein the first and second branches (27, 28) join one another downstream of the first and second components so as to flow together into the return point (23).

21. A vehicle (1) comprising:

at least one electric machine (4);

a power storage system (6), which is arranged in a central position, has a front wall (8) facing a front part of the vehicle (1) and has a rear wall (9) opposite the front wall (8) and facing a rear part of the vehicle (1);

a main thermoregulation circuit (10), which is arranged inside the power storage system (6), is configured to distribute a thermoregulation liquid within the power storage system (6) and has an inlet (11) for the thermoregulation liquid and an outlet (12) for the thermoregulation liquid;

a thermoregulation system (13), which is arranged in the front part of the vehicle (1) in front of the front wall (8) of the power storage system (6) and is configured to cause the thermoregulation liquid to circulate in the main thermoregulation circuit (10) introducing the thermoregulation liquid into the inlet (11) and receiving the thermoregulation liquid from the outlet (12);

a component, which is arranged in the rear part of the vehicle (1) behind the rear wall (9) of the power storage system (6); and a secondary thermoregulation circuit (21), which is arranged in the rear part of the vehicle (1) behind the rear wall (9) of the power storage system (6) and is coupled to the component;

wherein the main thermoregulation circuit (10) comprises: a drawing point (22), which goes through the rear wall (9) of the power storage system (6) and supplies the thermoregulation liquid to the secondary thermoregulation circuit (21); and a return point (23), which goes through the rear wall (9) of the power storage system (6) and receives the thermoregulation liquid from the secondary thermoregulation circuit (21);

wherein the secondary thermoregulation circuit (21) has a nominal flow rate of the thermoregulation liquid ranging from 10% to 35% of a nominal flow rate of the thermoregulation liquid of the main thermoregulation circuit (10).

\*   \*   \*   \*   \*